US011601197B2

(12) United States Patent
Featherston et al.

(10) Patent No.: US 11,601,197 B2
(45) Date of Patent: *Mar. 7, 2023

(54) OPTICAL TRANSCEIVER WITH VARIABLE DATA RATE AND SENSITIVITY CONTROL

(71) Applicant: NORTHROP GRUMMAN SYSTEMS CORPORATION, Falls Church, VA (US)

(72) Inventors: John Featherston, Fort Wayne, IN (US); Christopher A. Archer, Fort Wayne, IN (US); James M. Cicchiello, Fort Wayne, IN (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 259 days.

This patent is subject to a terminal disclaimer.

(21) Appl. No.: 17/065,628

(22) Filed: Oct. 8, 2020

(65) Prior Publication Data

US 2021/0028861 A1 Jan. 28, 2021

Related U.S. Application Data

(63) Continuation of application No. 16/022,329, filed on Jun. 28, 2018, now Pat. No. 10,848,241, which is a
(Continued)

(51) Int. Cl.
*H04B 10/11* (2013.01)
*H04B 10/079* (2013.01)
(Continued)

(52) U.S. Cl.
CPC ....... *H04B 10/07955* (2013.01); *H04B 10/40* (2013.01); *H04B 10/11* (2013.01); *H04B 10/6932* (2013.01)

(58) Field of Classification Search
CPC .. H04B 10/07955; H04B 10/40; H04B 10/11; H04B 10/6932
(Continued)

(56) References Cited

U.S. PATENT DOCUMENTS

| 4,756,007 A | 7/1988 | Qureshi et al. |
| 5,060,304 A | 10/1991 | Solinsky |

(Continued)

FOREIGN PATENT DOCUMENTS

| CA | 2941268 A1 | 11/2015 |
| JP | 2004071630 A | 3/2004 |

(Continued)

OTHER PUBLICATIONS

Barsimantov, et al.: "Adaptive Optimization of a Free Space Laser Communication System Under Dynamic Link Attenuation"; Optical Society of America, vol. 3, No. 3, Mar. 2011, J. Opt. Commun. Netw., pp. 215-222.

(Continued)

*Primary Examiner* — Dibson J Sanchez
(74) *Attorney, Agent, or Firm* — Tarolli, Sundheim, Covell & Tummino LLP

(57) ABSTRACT

An optical communications system includes a modulator/demodulator (modem) to transmit outgoing communications data and to receive incoming communications data in a transceiver. A main detector is coupled to the modem to convert an optical signal representing the incoming communications data to an electrical signal for the modem. An adaptive data rate processor monitors the electrical signal from the main detector to determine a current power level for the optical signal. The adaptive data rate processor dynamically adjusts a data rate of the modem based on the determined current power level of the optical signal.

20 Claims, 5 Drawing Sheets

Related U.S. Application Data continuation of application No. 14/132,992, filed on Dec. 18, 2013, now Pat. No. 10,038,497.

(51) Int. Cl.
*H04B 10/40* (2013.01)
*H04B 10/69* (2013.01)

(58) Field of Classification Search
USPC .................................................. 398/118–131
See application file for complete search history.

(56) References Cited

U.S. PATENT DOCUMENTS

| | | | |
|---|---|---|---|
| 5,450,438 A | 9/1995 | Landry et al. | |
| 5,491,548 A | 2/1996 | Bell et al. | |
| 5,513,213 A * | 4/1996 | Patel | H04L 5/1446 375/222 |
| 5,541,955 A | 7/1996 | Jacobsmeyer | |
| 5,577,087 A | 11/1996 | Furuya | |
| 5,808,760 A | 9/1998 | Gfeller | |
| 5,862,141 A * | 1/1999 | Trotter | H04L 1/0025 370/468 |
| 5,940,439 A * | 8/1999 | Kleider | H04L 1/0038 375/240 |
| 5,982,813 A * | 11/1999 | Dutta | H04W 52/267 370/468 |
| 6,154,489 A | 11/2000 | Kleider et al. | |
| 6,163,766 A * | 12/2000 | Kleider | H04L 1/0003 704/229 |
| 6,215,793 B1 | 4/2001 | Gultekin et al. | |
| 6,330,278 B1 * | 12/2001 | Masters | H04B 17/309 375/264 |
| 6,359,934 B1 | 3/2002 | Yoshida | |
| 6,370,189 B1 | 4/2002 | Khayrallah | |
| 6,420,895 B1 | 7/2002 | Herr et al. | |
| 6,473,213 B1 | 10/2002 | Wandernoth et al. | |
| 6,735,718 B2 | 5/2004 | Miller | |
| 6,765,975 B2 | 7/2004 | Dunning et al. | |
| 6,975,599 B1 * | 12/2005 | Johnson | H04L 1/0002 370/278 |
| 7,076,033 B2 | 7/2006 | Sidhu et al. | |
| 7,190,754 B1 | 3/2007 | Chang et al. | |
| 7,215,891 B1 | 5/2007 | Chiang et al. | |
| 7,421,248 B1 * | 9/2008 | Laux | H04L 1/0015 455/445 |
| 7,477,702 B2 | 1/2009 | Tang | |
| 7,532,645 B1 | 5/2009 | Bataineh et al. | |
| 7,668,125 B2 * | 2/2010 | Kadous | H04L 1/0002 370/465 |
| 7,809,276 B2 | 10/2010 | Ekkizogloy et al. | |
| 7,831,154 B2 | 11/2010 | Alwan et al. | |
| 7,844,228 B2 | 11/2010 | Kitakado | |
| 8,023,580 B2 * | 9/2011 | Bremer | H04L 27/0008 |
| 8,107,819 B2 | 1/2012 | Yang et al. | |
| 8,364,040 B1 | 1/2013 | Gerszberg et al. | |
| 8,374,513 B2 | 2/2013 | Koiwai | |
| 8,401,117 B1 | 3/2013 | Su | |
| 8,742,316 B2 | 6/2014 | Kim et al. | |
| 9,431,439 B2 | 8/2016 | Soga et al. | |
| 2002/0057480 A1 * | 5/2002 | Ushiyama | H04B 10/6911 398/208 |
| 2002/0099529 A1 | 7/2002 | Tang | |
| 2002/0131486 A1 | 9/2002 | Haartsen | |
| 2003/0028338 A1 | 2/2003 | Hidaka | |
| 2003/0087659 A1 * | 5/2003 | Wang | H04L 5/1446 455/88 |
| 2003/0178552 A1 * | 9/2003 | Hofmeister | H04B 10/6911 250/214 R |
| 2003/0231706 A1 | 12/2003 | Hwang | |
| 2003/0231887 A1 | 12/2003 | Grassi et al. | |
| 2004/0086283 A1 * | 5/2004 | Paoli | H04B 10/1121 398/212 |
| 2004/0184810 A1 | 9/2004 | Spilman et al. | |
| 2004/0240377 A1 * | 12/2004 | Palin | H04L 1/0003 370/204 |
| 2005/0036595 A1 * | 2/2005 | Sidhu | H04L 25/0262 379/93.08 |
| 2005/0196170 A1 | 9/2005 | Winsor | |
| 2005/0205759 A1 * | 9/2005 | Wang | H04B 10/66 257/E31.116 |
| 2005/0238357 A1 | 10/2005 | Farrell | |
| 2006/0198450 A1 | 9/2006 | Cheng et al. | |
| 2006/0280511 A1 * | 12/2006 | Futami | H04B 10/6911 398/209 |
| 2007/0049207 A1 | 3/2007 | Haghighat et al. | |
| 2007/0217357 A1 * | 9/2007 | Kitakado | H04W 72/10 370/329 |
| 2007/0248357 A1 * | 10/2007 | Fediakine | H04B 10/564 398/27 |
| 2007/0297808 A1 | 12/2007 | Pavelchek | |
| 2009/0196602 A1 | 8/2009 | Saunders et al. | |
| 2009/0196624 A1 * | 8/2009 | Zhang | H04B 10/40 398/135 |
| 2009/0236502 A1 * | 9/2009 | Ishii | H03G 3/3084 250/214 R |
| 2009/0238582 A1 * | 9/2009 | Tsunoda | H04B 10/6911 398/208 |
| 2010/0239048 A1 | 9/2010 | Lee et al. | |
| 2010/0297949 A1 | 11/2010 | Nakajima | |
| 2010/0316394 A1 * | 12/2010 | Koiwai | H04B 10/695 398/208 |
| 2011/0133059 A1 | 6/2011 | Kim et al. | |
| 2011/0240865 A1 | 10/2011 | Frach et al. | |
| 2012/0076026 A1 * | 3/2012 | Ballas | H04L 1/0002 370/252 |
| 2016/0284878 A1 * | 9/2016 | Zarkesh-Ha | H01L 31/02027 |
| 2017/0033886 A1 * | 2/2017 | Tada | H04L 43/0894 |

FOREIGN PATENT DOCUMENTS

| | | |
|---|---|---|
| JP | 2004180188 A | 6/2004 |
| JP | 2008141503 A | 6/2008 |
| JP | 2008537430 A | 9/2008 |
| JP | 2010517371 A | 5/2010 |
| JP | 2011139407 A | 7/2011 |
| JP | 2011239120 A | 11/2011 |
| JP | 2014529216 A | 10/2014 |
| KR | 20140067032 A | 6/2014 |
| WO | 199808307 A1 | 2/1998 |

OTHER PUBLICATIONS

Bradenburg, et al.: "Signal Detection in Optical Communications Through the Atmospheric Turbulence Channel"; IEEE Communications Society, IEEE "Globecom" 2008 Proceedings, pp. 1-5.

Lee, et al.: "Performance of the Transport Layer Protocol for Diversity Communication Over the Clear Turbulent Atmospheric Optical Channel"; IEEE 2005.

* cited by examiner

OPTICAL TRANSCEIVER WITH VARIABLE DATA RATE AND SENSITIVITY CONTROL

CROSS-REFERENCE TO RELATED APPLICATION

This application is a continuation of, and claims priority to, co-pending U.S. patent application Ser. No. 16/022,329, filed 28 Jun. 2018, which is a continuation of U.S. patent application Ser. No. 14/132,992, filed 18 Dec. 2013, which issued as U.S. Pat. No. 10,038,497 on 31 Jul. 2018.

TECHNICAL FIELD

This disclosure relates to optical communications, and more particularly to an optical transceiver system and method that dynamically varies the communications data rate of the system based upon detected optical power levels.

BACKGROUND

Free space optical communication has attracted considerable attention recently for a variety of applications. Atmospheric turbulence can degrade the performance of free-space optical links (e.g., tens of decibels), particularly over ranges of the order of 1 km or longer. Lack of homogeneity in the temperature and pressure of the atmosphere, for example, can lead to variations of the refractive index along the optical transmission path. Such refractive index variations can deteriorate the quality of the received image and can cause fluctuations in both the intensity and the phase of the received optical signal. These fluctuations, which are also referred to as fading, can lead to an increase in the link error probability, limiting the performance of optical communication systems.

For optical communications systems design, the effects of fading should be accounted for to ensure reliable system operation. In suitable atmospheric conditions, received optical signals may be strong which could saturate a photodetector at the optical receiver. In poor atmospheric conditions, weak optical signals need to be boosted over background noise levels in order to properly distinguish transmitted data from noise. Thus, optical systems needs to be designed to operate over a fairly large dynamic power range accounting for strong signal strength under optimal conditions and weak signal strength under poor conditions.

SUMMARY

This disclosure relates to optical communications systems. In one aspect, an optical communications system includes a modulator/demodulator (modem) to transmit outgoing communications data and to receive incoming communications data in a transceiver. A main detector is coupled to the modem to convert an optical signal representing the incoming communications data to an electrical signal for the modem. An adaptive data rate processor monitors the electrical signal from the main detector to determine a current power level for the optical signal. The adaptive data rate processor dynamically adjusts a data rate of the modem based on the determined current power level of the optical signal.

In another aspect, an optical communications system includes a modulator/demodulator (modem) to transmit outgoing communications data and to receive incoming communications data in a transceiver. A main detector is coupled to the modem to convert an optical signal representing the incoming communications data to an electrical signal for the modem. An auxiliary detector detects a power level of the optical signal and generates an electrical output signal representing the power level. An adaptive data rate processor monitors the electrical output signal from the auxiliary detector to determine a current power level for the optical signal. The adaptive data rate processor dynamically adjusts a data rate of the modem based on the determined current power level of the optical signal.

In yet another aspect, an optical communications method includes detecting a current power level of a received optical signal in an optical transceiver. The method includes determining if the current power level of the received optical signal has changed from a previous power level. The method includes adjusting a data rate for the optical transceiver if the current power level of the received optical signal has changed from the previous power level. The method also includes adjusting a sensitivity level of at least one detector in the optical transceiver if the current power level of the received optical signal has changed from the previous power level.

DETAILED DESCRIPTION

Figure 1:
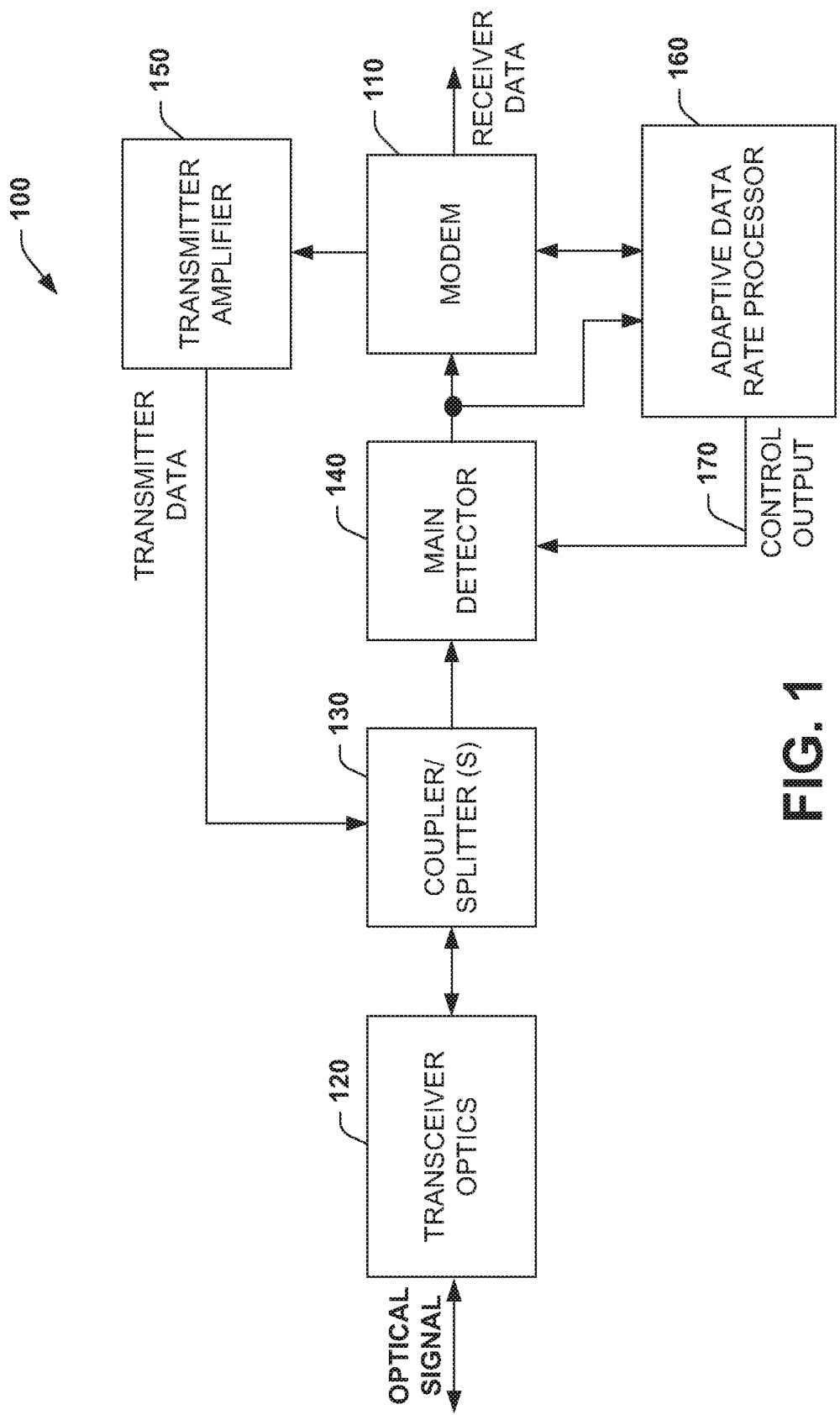
FIG. 1 illustrates an example of an optical communications system that dynamically varies the communications data rate of a modulator/demodulator (modem) based upon detected optical power levels.

This disclosure relates to an optical transceiver system and method that dynamically varies the communications data rate of a modulator/demodulator (modem) based upon detected optical power levels. Atmospheric conditions are continuously monitored to determine the strength of received optical signals. During clear line-of-sight conditions between optical transmitter and receiver, optical signal strength can be stronger (e.g., higher signal-to-noise) than when fading conditions cause the signal strength to degrade. An adaptive data rate processor periodically monitors incoming signal strength and can dynamically increase or decrease communications data rate of the modem based on detection of the current signal conditions. For example, under strong signal conditions, data rate can be increased to accommodate favorable conditions and improve communications throughput. When weak signal conditions are detected (e.g., due to fading, pointing, acquisition, tracking (PAT) misalignment, and/or distance limitations), data rate of the modem can automatically be reduced by the adaptive data rate processor to mitigate loss of data.

In one example, a main detector can be employed to detect incoming power level conditions and to also receive optical communications data for the modem. In addition to adjusting the data rate of the modem based on the detected power level, the adaptive data rate processor can also dynamically increase or decrease the sensitivity of the main detector. This can include applying differing reverse bias voltage levels to an avalanche photodiode to increase or decrease detector sensitivity and further enhance communications performance (e.g., increase detector sensitivity for weak signal conditions). Thus, when power level changes are detected, the adaptive data rate processor can dynamically change the data rate at which the modem operates and/or dynamically change the sensitivity of the optical transceiver system. Such data rate changes can be communicated via a negotiation protocol with a remote transceiver for synchronous data rate adjustments (e.g., send a header packet indicating data rate change to remote transceiver). In another example, each transmitter in the local and remote communications loop can asynchronously adjust the respective data rate (e.g., for every 10 db in power level detected, increase or decrease data rate by predetermined amount based on detected power level change).

In yet another example, an auxiliary detector can be employed to detect power level changes by the adaptive data rate processor while the main detector is utilized to receive optical data and convert the optical data to electrical data at the modem. The adaptive data rate processor can dynamically adjust the data rate of the modem based on the signal detected from the auxiliary detector. In this example, the adaptive data rate processor can also dynamically adjust the sensitivity of both the main detector and the auxiliary detector to further improve communications performance. Various transceiver configurations can be provided to both transmit and receive optical data. A method is also provided for dynamically adjusting transceiver data rate and/or transceiver sensitivity based on detected optical conditions.

FIG. 1 illustrates an example of an optical communications system 100 that dynamically varies the communications data rate of a modulator/demodulator (modem) 110 based upon detected optical power levels. The system 100 includes receiver optics 120 that can include telescopic components and filters for transmitting and/or receiving an optical signal via a line-of sight optical path (or substantially line-of-sight). Output from the receiver optics 120 is fed to one or more optical couplers and/or splitters 130 that pass the optical signal to a main detector 140. As used herein, a coupler is typically a fiber (e.g., multimode fiber) for guiding light whereas a splitter typically utilizes a lens and/or mirrors to guide the light. Output from the main detector 140 is passed to the modem 110 as an electrical signal where receiver data is processed and sent as an output to other computing/network devices (not shown). A transmitter amplifier 150 receives transmitter data from the modem 110 and transmits optical signals having modulated transmitter data via the coupler/splitters 130 and transceiver optics 120 to a remote optical transceiver (not shown).

The modem 110 transmits outgoing communications data and receives incoming communications data in the optical communications system 100 which can also be referred to as an optical transceiver. The main detector 140 is coupled to the modem 110 and converts an optical signal representing the incoming communications data to an electrical signal for the modem. An adaptive data rate processor 160 periodically monitors the electrical signal from the main detector 140 to determine a current power level for the optical signal. Based on the monitoring, the adaptive data rate processor 160 dynamically adjusts a data rate of the modem based on the current power level of the optical signal.

Atmospheric conditions are periodically monitored via the electrical signal output of the main detector 140 to determine the strength of received optical signals. During clear line-of-sight conditions between the remote optical transmitter (not shown) and local receiver depicted as part of the system 100, optical signal strength can be stronger (e.g., higher signal-to-noise) than when fading conditions cause the signal strength to degrade. The adaptive data rate processor 160 monitors incoming signal strength and can dynamically increase or decrease communications data rate of the modem 110 based on detection of the current signal conditions. For example, under strong signal conditions, data rate can be dynamically increased to accommodate favorable conditions and improve communications throughput. When weak signal conditions are detected (e.g., due to fading and/or distance limitations), data rate of the modem 110 can automatically be reduced by the adaptive data rate processor 160 to mitigate loss of data. The adaptive data rate processor 160 can be substantially any type of computing device and/or controller. This can include microprocessors, computers, microcontrollers, or controllers such as a programmable logic controller (PLC), for example. Such devices can be equipped with analog-to-digital (A/D) converters to monitor the various signals described herein.

As shown, the adaptive data rate processor 160 can include a control output 170 (or outputs) to dynamically adjust a sensitivity level of the main detector 140. For example, the adaptive data rate processor 160 can vary the control output 170 to operate the main detector 140 in a range between high sensitivity for weak optical signals to low sensitivity for strong optical signals. In one specific example, the adaptive data rate processor 160 employs the control output 170 to dynamically adjust a bias voltage on the main detector 140 and to dynamically adjust the sensitivity level of the main detector 140. For example, the main detector 140 can be an avalanche photo diode (APD) that operates between a range of Geiger mode for high sensitivity (e.g., single photon detection) and low bias mode for low sensitivity. The adaptive data rate processor 160 in this example dynamically adjusts the reverse bias voltage on the APD via control output 170 to select the sensitivity mode. The adaptive data rate processor 160 can include control circuits that can be analog or digital or combinations thereof. Such circuits can include microprocessors, microcontrollers, or controllers that execute computer-executable instructions to dynamically adjust sensitivity levels. In another example, discrete hardware control circuits including analog and/or digital components can be employed.

When an optical power level change has been detected by the adaptive data rate processor 160 by monitoring the main detector 140, the adaptive data rate processor 160 notifies the modem 110 to change its data rate in response to the detected power level change. Also, the adaptive data rate processor 160 can dynamically adjust the sensitivity level of the main detector 140 via the control output 170 based on the detected power level change. In one example of synchronous data rate change between the system 100 and the remote transceiver, the modem 110 can transmit a packet of data (e.g., header packet) indicating a data rate change to the optical transmitter 150 that communicates the data rate change to the remote transceiver based on a command from the adaptive data rate processor 160. For instance, the modem 110 can negotiate a new data rate with the remote transceiver by exchanging data packets that indicate the new data rate. After successful negotiation, both the modem 110 and a modem operating at the remote transceiver can adjust their respective data rates accordingly (e.g., lower data rates for weak optical signals due to fading and high data rates for strong signal conditions). As used herein data rate can be defined as a number of bits per second or commonly referred to as baud rate.

In another example of asynchronous data rate change between the system 100 and the remote transceiver, it can be assumed in some cases that both the system 100 and the remote transceiver system detect similar changes in optical power levels in a concurrent manner. In such a case, the adaptive data rate processor 160 can command the modem 110 to a new data rate based upon detecting a power level change from the current power level where the new data rate is based upon a predetermined power threshold. For example, if the optical power level has been detected to have dropped by 10 db but not more than 20 db, the adaptive data rate processor 160 can command the modem 110 to adjust its current data rate to a predetermined data rate associated with the detected power level change. Both the modem 110 and remote modem at the remote transceiver can wait a predetermined time period, if necessary, before resuming communications based on the new data rate and detected power level.

In another example, the adaptive data rate processor 160 can dynamically adjust the data rate based upon system mode. For example, the system mode can include a coarse-mode for pointing where transmitter and receiver terminals are directed to search for other communicating terminals. The system mode can include a mid-mode for acquisition where the transmitter and receiver terminals are localized to a region. Yet another system mode can include a tracking-mode where the transmitter and receiver terminal have locked positions for transmitting and receiving data between the terminals. The adaptive data rate processor 160 can dynamically adjust the data rate if tracking between the terminals during the tracking mode degrades to support reentry into the coarse-mode or the mid-mode, where the data rate may have to decrease for example to support reentry into one or more of the other system modes.

In another example, the adaptive data rate processor 160 can dynamically adjust the data rate based upon an estimated bit error rate (BER). Also, the adaptive data rate processor 160 can dynamically adjust the data rate independently between a header portion and a data portion of a data packet. This includes dynamically adjusting the data rate independently for transmitted data packets while receiving data packets with different information rates from the transmitted data packets, for example. In another example, the adaptive data rate processor 160 can dynamically adjust the data rate by repeating bits in a redundant pattern within a header portion or a data portion of a data packet to signal an increase or a decrease in the data rate. For example, normal data transmissions may include an alternating pattern of 1, 0, [data bit], 1, 0, [data bit] and so forth. If the alternating packet is instead repeated such as 111, 000, for example, the receiving terminal can deduce that a data rate change should occur. The receiver of the data packet can thus sense the redundant pattern to dynamically increase or decrease the data rate. In one other example, the system 100 can include a separate communications channel (not shown) that is established between transmitter and receiver terminals to negotiate data rate changes. The separate communications channel can include at least one of an electrical link, a radio frequency (RF) link, and a fiber optic link, for example.

Figure 3:
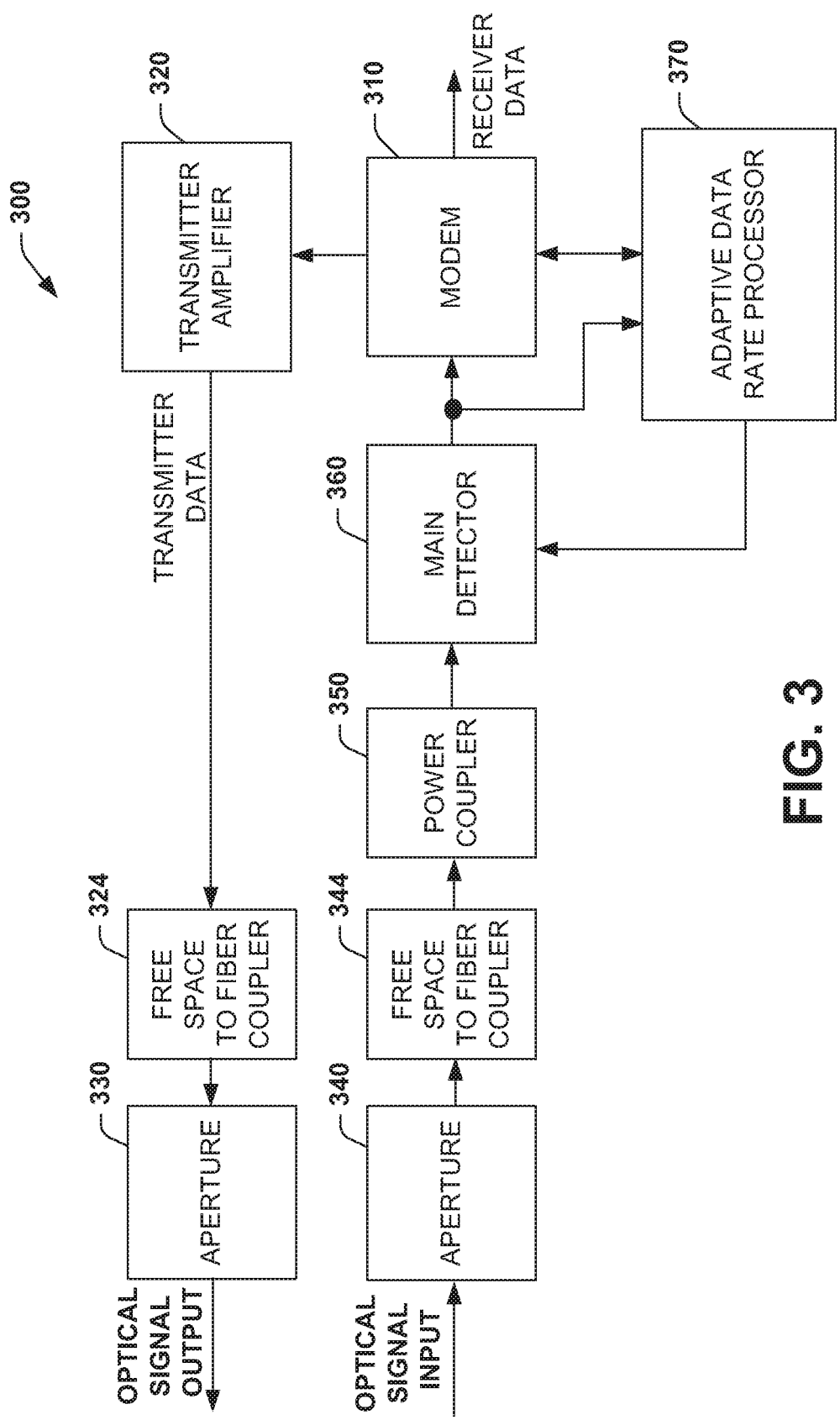
FIG. 3 illustrates an example of an optical communications system that employs separate transmitter and receiver paths to dynamically vary the communications data rate of a modulator/demodulator (modem) based upon detected optical power levels.

Various configurations are possible for the system 100 depending on configuration of the transceiver optics 120 and coupler/splitters 130. For example, the transceiver optics 120 can include a first aperture to transmit or receive the optical signal to or from the remote transceiver. In another example, a second aperture can be employed to transmit or receive the optical signal to or from the remote transceiver. Thus, one aperture can be employed to transmit optical data and the second aperture can be employed receive optical data. The coupler/splitters 130 can include a first free space to fiber coupler to couple the optical signal from the first aperture to an optical receiver fiber and a second free space to fiber coupler to couple the optical signal from a transmitter fiber to the second aperture. Yet another coupler in the coupler/splitters 130 can include a power coupler to couple the optical signal from the receiver fiber to the main detector 140. FIG. 3 described below illustrates further examples of the apertures and couplers described herein.

In yet another example configuration (See FIG. 4), an auxiliary detector can be employed to detect power level changes by the adaptive data rate processor 160 while the main detector 140 is utilized to receive optical data and convert the optical data to electrical data at the modem 110. The adaptive data rate processor 160 can dynamically adjust the data rate of the modem 110 based on the signal detected from the auxiliary detector. In the auxiliary detector example, the adaptive data rate processor 160 can also dynamically adjust the sensitivity of both the main detector 140 and the auxiliary detector to further improve communications performance.

Figure 2:
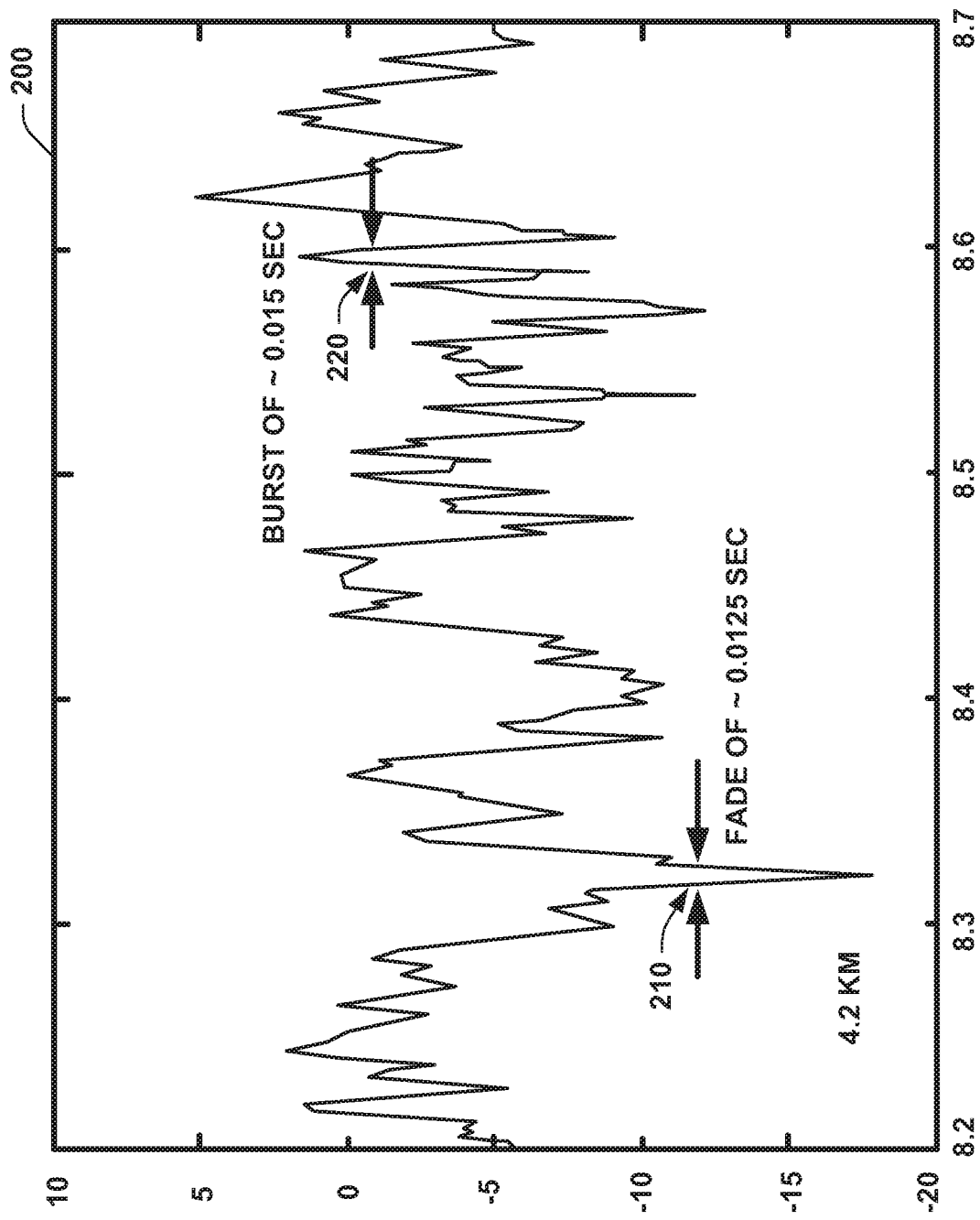
FIG. 2 illustrates an example diagram of received optical power levels that can be monitored by an adaptive data rate processor to adjust a data rate or a sensitivity level of an optical transceiver.

FIG. 2 illustrates an example diagram 200 of received optical power levels that can be monitored by an adaptive data rate processor to dynamically adjust a data rate or a sensitivity level of an optical transceiver. The diagram 200 depicts optical power levels that vary over time captured at 8.2 seconds on the left to 8.7 seconds on the right of the horizontal axis. The vertical axis of the diagram 200 represents power level changes from −20 db at the bottom to plus 5 db at the top. The optical power signal depicted in the diagram 200 was captured at about a distance of 4.2 kilometers between transmitter and receiver. As shown, an example fade at 210 can last for a period of about 12.5 milliseconds, whereas an example power burst at 220 lasts for about 15 milliseconds.

Such periods of burst and fading typically last for much longer intervals than the modulated data rate which can be on the order of 10's of gigabits per second. As such, the power signal can be analyzed by the adaptive data rate processor described above to determine when periods of fading or bursting have occurred and adjust date rates or sensitivity levels of the transceiver accordingly. For example, a slope analysis of the optical power signal along with analyzing how high or low the power signal has ascended or descended can be utilized to detect when the power levels have changed enough (e.g., beyond a predetermine threshold) such that a data rate and/or sensitivity level change ought to occur. Other mathematical functions such as averaging, derivatives, and integrals, for example, can be employed to analyze the respective power signal. As can be appreciated, the optical power signal depicted in the diagram 200 is but one example of a plurality of different transmitting and receiving conditions that are possible which would affect the shape and magnitude of the signal depicted in the diagram 200.

FIG. 3 illustrates an example of an optical communications system 300 that employs separate transmitter and receiver paths to dynamically vary the communications data rate of a modulator/demodulator (modem) 310 based upon detected optical power levels. As shown, the modem 310 transmits transmitter data via a transmitter optical amplifier 320 that couples to a free space to fiber coupler 324 which couples optical signal to an aperture 330 which drives an optical output to a remote transceiver (not shown). In contrast to the system depicted in FIG. 1, the system 300 employs separate receiver optics and couplers for the transmitter path and the receiver path of the system 300. With respect to optical signal input from the remote transceiver, the system 300 includes a second aperture 340 that couples the received optical signal to a second free space to fiber coupler 344. The apertures 330 and 340 can include telescopic components for transmitting and/or receiving optical data over a distance. Output from the coupler 344 is fed to a power coupler 350 which drives a main detector 360. The main detector 360 converts optical data to electrical data for the modem 310 and provides a power input to an adaptive data rate processor 370 to dynamically adjust the data rate to the modem 310 in view of detected power levels. As noted above, the adaptive data rate processor 370 can also dynamically adjust the sensitivity level of the main detector 360 based on the detected power levels from the main detector.

Figure 4:
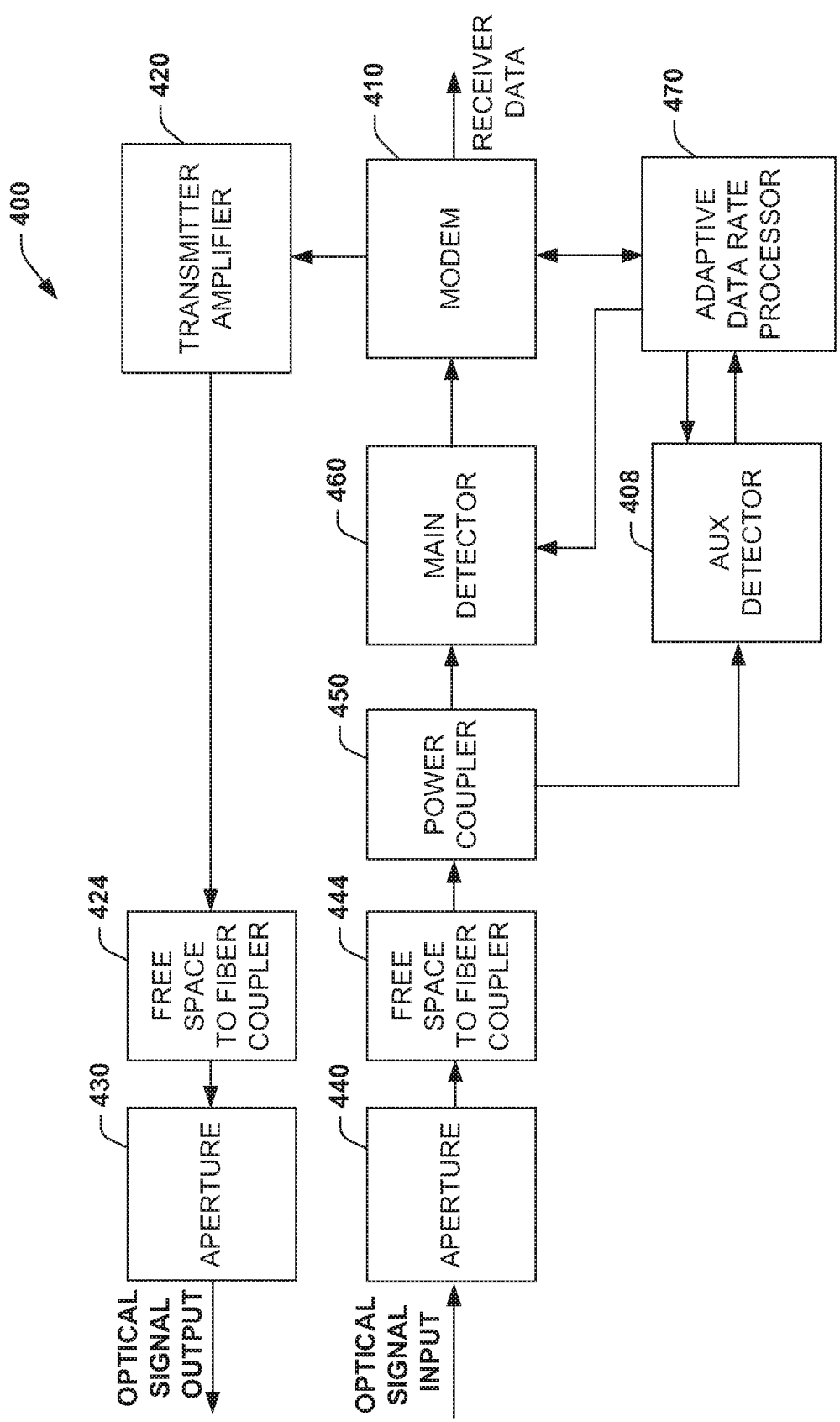
FIG. 4 illustrates an example of an optical communications system that employs an auxiliary detector to dynamically vary the communications data rate of a modulator/demodulator (modem) based upon detected optical power levels.

FIG. 4 illustrates an example of an optical communications system 400 that employs an auxiliary detector 408 to dynamically vary the communications data rate of a modulator/demodulator (modem) 410 based upon detected optical power levels. Similar to the system 300 of FIG. 3, the modem 410 transmits transmitter data via a transmitter optical amplifier 420 that couples to a free space to fiber coupler 424 which couples optical signal to an aperture 430 which drives an optical output to a remote transceiver (not shown). In contrast to the system depicted in FIG. 1, the system 400 employs separate receiver optics and couplers for the transmitter path and the receiver path of the system 400. With respect to optical signal input from the remote transceiver, the system 400 includes a second aperture 440 that couples the received optical signal to a second free space to fiber coupler 444. The apertures 430 and 440 can include telescopic components for transmitting and/or receiving optical data over a distance. Output from the coupler 444 is fed to a power coupler 450 which drives a main detector 460 and the auxiliary detector 408. The main detector 460 converts optical data to electrical data for the modem 410.

The auxiliary detector 408 can be employed to detect power level changes by an adaptive data rate processor 460 while the main detector 440 is utilized to receive optical data and convert the optical data to electrical data at the modem 410. The adaptive data rate processor 470 can dynamically adjust the data rate of the modem 410 based on the signal detected from the auxiliary detector 408. The adaptive data rate processor 470 can also dynamically adjust the sensitivity of both the main detector 460 and/or the auxiliary detector 408 to further improve communications performance.

Figure 5:
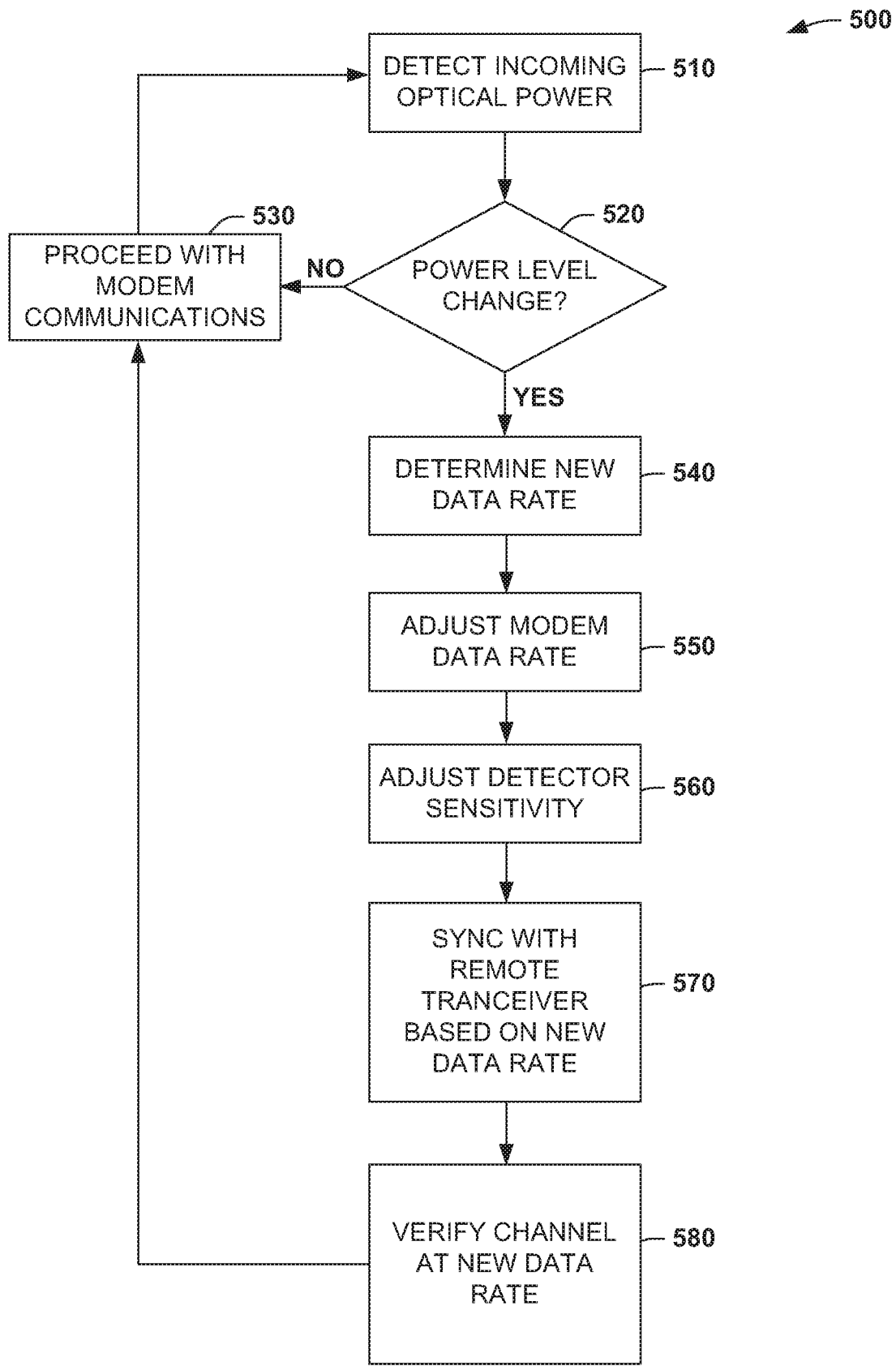
FIG. 5 illustrates an example of an optical communications method that dynamically varies the communications data rate of an optical transceiver based upon detected optical power levels.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. The various acts of the method depicted in FIG. 5 can be executed automatically such as via a processor, computer, and/or controller configured with executable instructions to carry out the various acts described herein. Moreover, discrete circuit control implementations are possible in addition to hybrid controls that include both discrete and integrated circuit processing elements.

As noted previously, the adaptive data rate processor 470 can dynamically adjust the data rate based upon system mode. For example, the system mode can include a coarse-mode where transmitter and receiver terminals are directed to search for other communicating terminals. The system mode can include a mid-mode for acquisition where the transmitter and receiver terminals are localized to a region. Yet another system mode can include a tracking-mode where the transmitter and receiver terminal have locked positions for transmitting and receiving data between the terminals. The adaptive data rate processor 470 can dynamically adjust the data rate if tracking between the terminals during the tracking mode degrades to support reentry into the coarse-mode or the mid-mode, where the data rate may have to decrease for example to support reentry into one or more of the other system modes.

In another example, the adaptive data rate processor 470 can dynamically adjust the data rate based upon an estimated bit error rate (BER). Also, the adaptive data rate processor 470 can dynamically adjust the data rate independently between a header portion and a data portion of a data packet. This includes dynamically adjusting the data rate independently for transmitted data packets while receiving data packets with different information rates from the transmitted data packets, for example. In another example, the adaptive data rate processor 470 can dynamically adjust the data rate by repeating bits in a redundant pattern within a header portion or a data portion of a data packet to signal an increase or a decrease in the data rate. For example, normal data transmissions may include an alternating pattern of 1, 0, [data bit], 1, 0, [data bit] and so forth. If the alternating packet is instead repeated such as 111, 000, for example, the receiving terminal can deduce that a data rate change should occur. The receiver of the data packet can thus sense the redundant pattern to dynamically increase or decrease the data rate. In one other example, the system 400 can include a separate communications channel (not shown) that is established between transmitter and receiver terminals to negotiate data rate changes. The separate communications channel can include at least one of an electrical link, a radio frequency (RF) link, and a fiber optic link, for example.

FIG. 5 illustrates an example of an optical communications method 500 that dynamically varies the communications data rate of an optical transceiver based upon detected optical power levels. At 510, the method 500 includes detecting (e.g., by a processor) a current power level of a received optical signal in an optical transceiver (e.g., via main detector 140 and adaptive rate processor 160 of FIG. 1). At 520, a determination is made regarding whether or not an optical power level has changed (e.g., via adaptive data processor 160 of FIG. 1). If the current power level has not changed from a previous power level at 520, the method proceeds to 530 and continues proceeds with current modem communications data rates. The method 500 can periodically proceed back to 510 to detect incoming power levels (e.g., during an interrupt routine).

At 540, the method 500 determines a new data rate (e.g., via adaptive data rate processor 160 of FIG. 1). The new data rate can be computed by comparing the current power level (or slope) to predetermined power thresholds for example. This could also include comparing to a power signature for a respective communications channel. At 550, the method 500 adjusts a data rate for the optical transceiver if the current power level of the received optical signal has changed from the previous power level as detected at 520 (e.g., via adaptive data rate processor 160 of FIG. 1). At 560, the method 500 adjusts a sensitivity level of at least one detector in the optical transceiver if the current power level of the received optical signal has changed from the previous power level (e.g., via control output 170 of FIG. 1). At 570, the method 500 includes syncing the new data rate with a remote transceiver based on the determined new data rate. This can include synchronous negotiations with the remote transceiver such as via a header packet that is transmitted to the remote transceiver to confirm the change of the new data rate.

In another example, asynchronous data rate changes could also be employed for example, where both local and remote transceivers could mutually change their respective data rates based upon detected power levels and predetermined power thresholds at each end of the communications path. A delay period could also be initiated at each end while each transceiver adjusts its respective data rate. At 580, the method 500 verifies the communications channel between the remote and local transceiver (e.g., via modem 110 of FIG. 1). This can include exchanging one or more data packets to confirm that the new data rate has been communicated and changed at the remote transceiver. After the data rate has been changed at 580, the method 500 proceeds back to 530 for further modem communications.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An optical communications method comprising:
    detecting, by a processor, a current power level of a received optical signal in an optical transceiver;
    determining, by the processor, if the current power level of the received optical signal has changed from a previous power level;
    adjusting, by the processor, a data rate for the optical transceiver to a new data rate based on the current power level of the received optical signal having changed from the previous power level, wherein the new data rate is based upon a predetermined power threshold; and
    adjusting, by the processor, a sensitivity level of at least one detector and a bit rate of a modem in the optical transceiver based on the current power level of the received optical signal having changed from the previous power level.

2. The method of claim 1, further comprising transmitting a packet of data indicating the adjustment of the data rate via a line-of-sight path to a remote transceiver.

3. The method of claim 1, further comprising the processor asserting a control output to dynamically adjust the sensitivity level of the at least one detector.

4. The method of claim 3, further comprising the processor employing the control output to dynamically adjust a bias voltage on the at least one detector to adjust the sensitivity level of the at least one detector.

5. The method of claim 1, further comprising the modem transmitting a packet of data indicating the adjustment of the data rate to an optical transmitter that communicates the adjustment of the data rate to a remote transceiver based on a command from the processor.

6. The method of claim 1, further comprising detecting, with auxiliary detector that is distinct from the at least one detector, a power level of the optical signal and generating an electrical output signal representing the power level.

7. The method of claim 6, wherein the auxiliary detector is an avalanche photo diode (APD) that operates between a range of Geiger mode for high sensitivity and low bias mode for low sensitivity, wherein the processor dynamically adjusts a reverse bias voltage on the APD to select Geiger mode, low bias mode or therebetween.

8. An optical communications method comprising:
    receiving an optical signal with both a main detector and an auxiliary detector of an optical transceiver;
    detecting, by a processor, a current power level of the optical signal as received by the auxiliary detector, and generating an electrical output signal representing the power level;
    determining, by the processor, if the current power level of the received optical signal has changed from a previous power level of the optical signal as received by the auxiliary detector;
    adjusting, by the processor, a data rate for the optical transceiver based on the current power level of the received optical signal having changed from the previous power level; and
    adjusting, by the processor, a sensitivity level of the main detector and a bit rate of a modem in the optical transceiver based on the current power level of the received optical signal having changed from the previous power level.

9. The method of claim 8, further comprising transmitting a packet of data indicating the adjustment of the data rate via a line-of-sight path to a remote transceiver.

10. The method of claim 9, wherein the auxiliary detector is an avalanche photo diode (APD) that operates between a range of Geiger mode for high sensitivity and low bias mode for low sensitivity, wherein the processor dynamically adjusts a reverse bias voltage on the APD to select Geiger mode, low bias mode or therebetween.

11. The method of claim 8, further comprising:
    the processor asserting a control output to dynamically adjust the sensitivity level of the main detector; and
    the processor employing the control output to dynamically adjust a bias voltage on the main detector to adjust the sensitivity level of the main detector.

12. The method of claim 8, further comprising the modem transmitting a packet of data indicating the adjustment of the data rate to an optical transmitter that communicates the adjustment of the data rate to a remote transceiver based on a command from the processor.

13. The method of claim 8, further comprising the processor dynamically adjusting the data rate based upon a system mode.

14. The method of claim 13, wherein the system mode includes a coarse pointing mode where transmitter and receiver terminals are directed to search for other communicating terminals, a mid-mode for acquisition where the transmitter and receiver terminals are localized to a region, and a tracking mode where the transmitter and receiver terminal have locked positions for transmitting and receiving data between the terminals.

15. An optical communications method comprising:
 detecting, by an adaptive data rate processor, a current power level of a received optical signal in an optical transceiver;
 determining, by the adaptive data rate processor, if the current power level of the received optical signal has changed from a previous power level;
 dynamically adjusting, by the adaptive data rate processor, a data rate for the optical transceiver based on the current power level of the received optical signal having changed from the previous power level, and further based on a system mode; and
 adjusting, by the adaptive data rate processor, a sensitivity level of at least one detector and a bit rate of a modem in the optical transceiver based on the current power level of the received optical signal having changed from the previous power level.

16. The method of claim 15, further comprising transmitting a packet of data indicating the adjustment of the data rate via a line-of-sight path to a remote transceiver.

17. The method of claim 16, wherein the system mode includes a coarse pointing mode where transmitter and receiver terminals are directed to search for other communicating terminals, a mid-mode for acquisition where the transmitter and receiver terminals are localized to a region, and a tracking mode where the transmitter and receiver terminal have locked positions for transmitting and receiving data between the terminals.

18. The method of claim 17, further comprising the adaptive data rate processor dynamically adjusting the data rate based on tracking between the terminals during the tracking mode degrading to support reentry into the coarse pointing mode or the mid-mode.

19. The method of claim 15, further comprising the adaptive data rate processor asserting a control output to dynamically adjust the sensitivity level of the at least one detector.

20. The method of claim 19, further comprising the adaptive data rate processor employing the control output to dynamically adjust a bias voltage on the at least one detector to adjust the sensitivity level of the at least one detector.

* * * * *